(12) United States Patent
Henry

(10) Patent No.: US 12,447,546 B2
(45) Date of Patent: Oct. 21, 2025

(54) SYSTEMS AND METHODS TO PROVIDE WELDING-TYPE ARC STARTING AND STABILIZATION

(71) Applicant: Illinois Tool Works Inc., Glenview, IL (US)

(72) Inventor: Andrew Henry, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1172 days.

(21) Appl. No.: 16/802,135

(22) Filed: Feb. 26, 2020

(65) Prior Publication Data

US 2021/0260682 A1    Aug. 26, 2021

(51) Int. Cl.
*B23K 9/073* (2006.01)

(52) U.S. Cl.
CPC .................... *B23K 9/073* (2013.01)

(58) Field of Classification Search
CPC .......... B23K 9/073; B23K 9/067; B23K 9/08; B23K 9/091; H01F 27/2895; H01F 27/00; H01F 27/027
USPC ...................................................... 219/130.4
See application file for complete search history.

(56) References Cited

U.S. PATENT DOCUMENTS

| | | | | |
|---|---|---|---|---|
| 2,892,104 A * | 6/1959 | Bain | .................. | H03K 5/15046 307/106 |
| 3,097,304 A * | 7/1963 | Eckert, Jr. | ................ | H03K 3/45 307/416 |
| 3,889,175 A * | 6/1975 | Isogai | ..................... | H02M 7/19 336/174 |
| 2006/0027545 A1 | 2/2006 | Stava | | |
| 2009/0230941 A1 * | 9/2009 | Vogel | .................. | B23K 9/1043 323/305 |

(Continued)

FOREIGN PATENT DOCUMENTS

| | | |
|---|---|---|
| GB | 2297934 | 8/1996 |
| JP | 2001320885 | 11/2001 |

(Continued)

OTHER PUBLICATIONS

European Office Communication with Extended Search Report Appln No. 21157340.7 dated Aug. 19, 2021.

(Continued)

*Primary Examiner* — Steven W Crabb
*Assistant Examiner* — Alba T Rosario-Aponte
(74) *Attorney, Agent, or Firm* — McAndrews, Held & Malloy, Ltd.

(57) ABSTRACT

An example arc starting/stabilizing circuit includes: a pulse generator configured to generate voltage pulses having a first voltage; and a plurality of transformers configured to receive the voltage pulses and output the voltage pulses to a welding-type output circuit at a second voltage higher than the first voltage, wherein: each of the plurality of transformers comprises one primary winding turn, one secondary winding turn, and a core configured to magnetically couple the primary winding turn and the secondary winding turn; the primary winding turns of the plurality of transformers are coupled to the pulse generator to receive the voltage pulses; and the secondary winding turns of the plurality of transformers are coupled in series and are configured to conduct welding-type current in the welding-type output circuit.

11 Claims, 7 Drawing Sheets

(56) References Cited

U.S. PATENT DOCUMENTS

2018/0253570 A1\* 9/2018 Miller ................ H01F 27/2895
2021/0129250 A1   5/2021 Vogel

FOREIGN PATENT DOCUMENTS

WO    9810498      3/1998
WO    2018126223   7/2018

OTHER PUBLICATIONS

Canadian Office Action Appln No. 3,107,867 dated Jan. 10, 2024.
European Examination Report Appln No. 21157340.7 dated Jan. 23, 2024.
Canadian Office Action Appln No. 3,107,867 dated Oct. 8, 2024.

\* cited by examiner

SYSTEMS AND METHODS TO PROVIDE WELDING-TYPE ARC STARTING AND STABILIZATION

BACKGROUND

This disclosure relates generally to welding-type systems and, more particularly, to systems and methods to provide welding-type arc starting and stabilization.

High voltage, high frequency outputs can be used to improve arc striking and/or stabilization of welding arcs. For instance, circuits may be configured to output high voltage, high frequency pulses to the weld circuit to enable arc striking without contacting a tungsten electrode to the workpiece. Additionally or alternatively, outputting high voltage, high frequency pulses to the weld circuit during the welding operation may reduce the likelihood of the arc extinguishing during low-current operation or other conditions that can lead to extinguishing of the arc.

SUMMARY

Systems and methods to provide welding-type arc starting and stabilization are disclosed, substantially as illustrated by and described in connection with at least one of the figures, as set forth more completely in the claims.

BRIEF DESCRIPTION OF THE DRAWINGS

The figures are not to scale. Where appropriate, the same or similar reference numerals are used in the figures to refer to similar or identical elements.

DETAILED DESCRIPTION

Figure 1A:
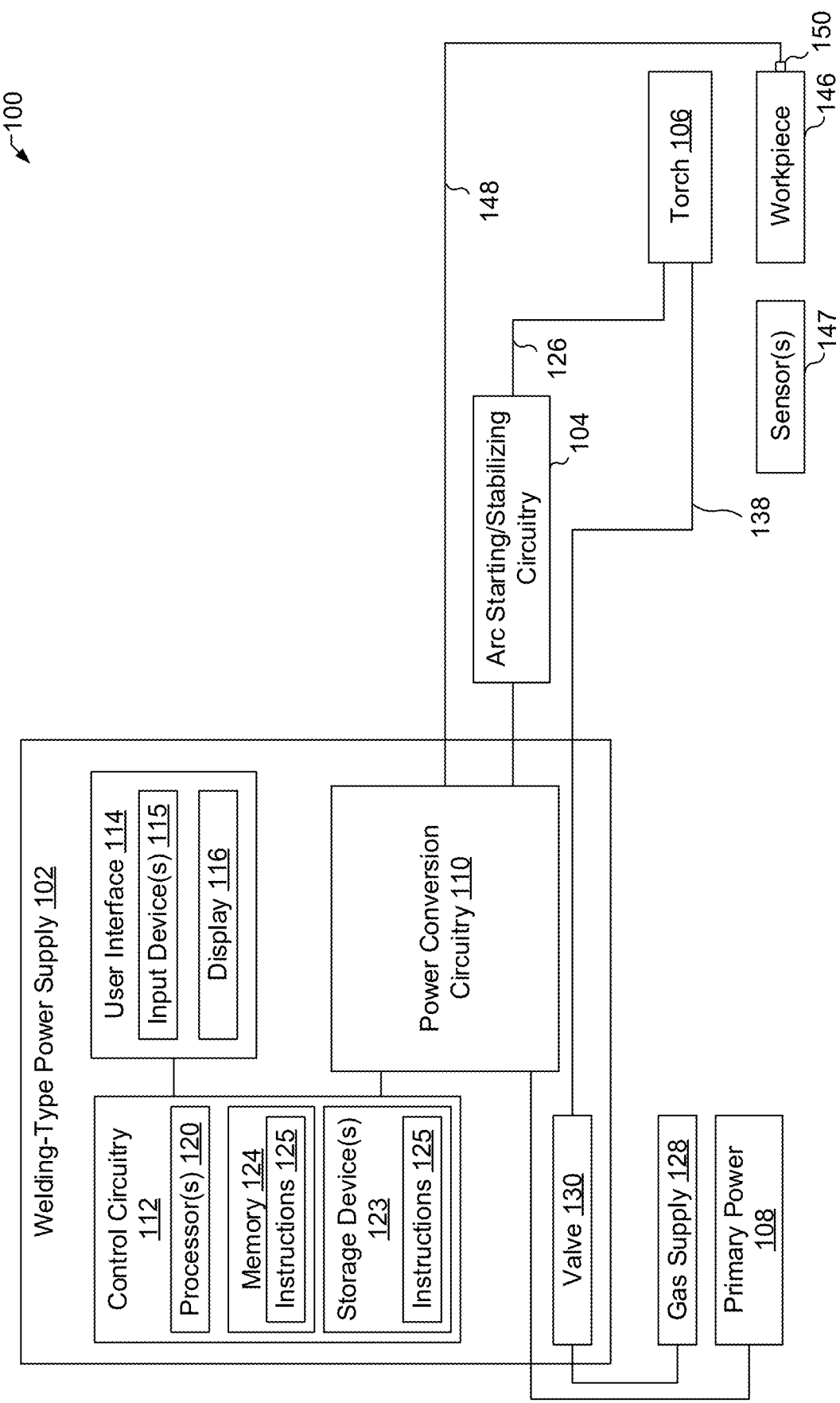
FIG. 1A is a block diagram of an example welding-type system including a welding-type power supply configured to output welding-type power and including arc starting/stabilizing circuitry coupled to the output of the welding-type power supply, in accordance with aspects of this disclosure.

Conventional arc starting/stabilizing circuitry includes transformers that present substantial tradeoffs. As described in more detail below, transformers used in conventional arc starting/stabilizing circuitry are costly and complex to manufacture.

In contrast with conventional arc starting/stabilizing circuitry and conventional transformers, disclosed example arc starting/stabilizing circuitry include multiple transformers that substantially decrease the complexity and cost associated with construction, and/or improve the efficiency of the transformer in the arc starting/stabilizing circuitry.

In addition or as an alternative to arc starting and/or arc stabilization for welding-type operations (e.g., gas metal arc welding (GMAW), gas tungsten arc welding (GTAW), shielded metal arc welding (SMAW), flux cored arc welding (FCAW), etc.), disclosed example systems and methods may be used with any welding-type process to add high voltage, low current energy. Additionally or alternatively, the disclosed example arc starting/stabilizing circuitry may be controlled to output high voltage, low current pulses to implement a low open circuit voltage mode of operation, in which the welding power supply is controlled to not output weld voltage until a starting event is detected. An example implementation of a low open circuit voltage mode, in which the disclosed systems and methods may be implemented, is disclosed in U.S. patent application Ser. No. 16/670,993, filed Oct. 31, 2019, entitled "Systems and Methods to Provide Welding-Type Arc Starting and Stabilization with Reduced Open Circuit Voltage." The entirety of U.S. patent application Ser. No. 16/670,993 is incorporated herein by reference.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include power limiting circuitry, output selection circuitry, measurement and/or control circuitry, and/or any other circuits to provide appropriate features.

As used herein, the terms "first" and "second" may be used to enumerate different components or elements of the same type, and do not necessarily imply any particular order. For example, while in some examples a first time occurs prior to a second time within a time period, the terms "first time" and "second time" do not imply any specific order in which the first or second times occur relative to the other within the time period.

Welding-type power supply, welding-type power source, and welding-type system, as used herein, refers to any device capable of, when power is applied thereto, supplying welding, cladding, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit," or "circuitry," includes any analog and/or digital components, power and/or control elements, such as a microprocessor, digital signal processor (DSP), software, and the like, discrete and/or integrated components, or portions and/or combinations thereof. As utilized herein the terms "circuits" and "circuitry" refer to: physical electronic components (i.e. hardware)"), including any analog and/or digital components, power and/or control elements, such as a microprocessor, digital signal processor (DSP), software, and the like, discrete and/or integrated components, or portions and/or combinations thereof; and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), flash memory, solid state storage, a computer-readable medium, or the like.

As used herein, the term "torch," "welding torch," "welding tool" or "welding-type tool" refers to a device configured to be manipulated to perform a welding-related task, and can include a hand-held welding torch, robotic welding torch, gun, gouging tool, cutting tool, or other device used to create the welding arc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW, e.g., TIG), shielded metal arc welding (SMAW), spray, short circuit, CAC-A, gouging process, cutting process, and/or any other type of welding process.

As used herein, the term "setpoint" refers to a target, such as a voltage target or current target, at which the welding-type power is to be output by controlling the power conversion circuitry.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Disclosed example an arc starting/stabilizing circuits include a pulse generator configured to generate voltage pulses having a first voltage, and a plurality of transformers configured to receive the voltage pulses and output the voltage pulses to a welding-type output circuit at a second voltage higher than the first voltage. Each of the plurality of transformers has one primary winding turn, one secondary winding turn, and a core configured to magnetically couple the primary winding turn and the secondary winding turn. The primary winding turns of the plurality of transformers are coupled to the pulse generator to receive the voltage pulses, and the secondary winding turns of the plurality of transformers are coupled in series and are configured to conduct welding-type current in the welding-type output circuit.

In some example arc starting/stabilizing circuits, the secondary winding turns collectively constitute a straight conductor extending through the cores of the plurality of transformers. In some examples, the cores of the plurality of transformers are each positioned to encircle the secondary winding turns of the plurality of transformers, and the one primary winding turn of each of the transformers is wound around one leg of the corresponding core.

Some example arc starting/stabilizing circuits further include one or more printed circuit boards, in which the primary winding turns of the plurality of transformers include respective traces on the one or more printed circuit boards, and the cores of the plurality of transformers are coupled to the one or more printed circuit boards. In some examples, for each of the plurality of transformers, the secondary winding turn is not physically wound around the core. Some example arc starting/stabilizing circuits further include a switch configured to selectively disconnect at least one of the plurality of transformers from the pulse generator. Some such example arc starting/stabilizing circuits further include a control circuit configured to selectively close or open the switch to control the second voltage from the plurality of transformers.

Disclosed example welding-type systems include power conversion circuitry configured to convert input current to welding-type current, and to output the welding-type current to a welding-type circuit, and arc starting/stabilizing circuitry coupled to the welding-type circuit and configured to output a plurality of output voltage pulses to the welding-type circuit. The arc starting/stabilizing circuitry includes a pulse generator configured to generate lower voltage pulses having a first voltage, and a plurality of transformers configured to receive the lower voltage pulses and output the output voltage pulses to a welding-type output circuit at a second voltage higher than the first voltage. Each of the plurality of transformers has one primary winding turn, one secondary winding turn, and a core configured to magnetically couple the primary winding turn and the secondary winding turn. The primary winding turns of the plurality of transformers are coupled in parallel, and coupled to the pulse generator to receive the lower voltage pulses. The secondary winding turns of the plurality of transformers are coupled in series with the welding-type circuit to output the output voltage pulses to the welding-type circuit.

Some example welding-type systems include a housing, in which the power conversion circuitry and the arc starting/stabilizing circuitry are enclosed within the housing. In some examples, the arc starting/stabilizing circuitry is detachable from the welding-type circuit. Some example welding-type systems, further include control circuitry configured to control the power conversion circuitry and to control the arc starting/stabilizing circuitry to selectively output the output voltage pulses.

In some example welding-type systems, the secondary winding turns collectively constitute a straight conductor extending through the cores of the plurality of transformers. In some examples, the cores of the plurality of transformers are each positioned to encircle the secondary winding turns of the plurality of transformers, and the one primary winding turn of each of the transformers is wound around one leg of the corresponding core.

In some example welding-type systems, the arc starting/stabilizing circuitry includes one or more printed circuit boards, wherein the primary winding turns of the plurality of transformers comprise respective traces on the one or more printed circuit boards, and the cores of the plurality of transformers are coupled to the one or more printed circuit boards. In some examples, for each of the plurality of transformers, the secondary winding turn is not physically wound around the core. Some example welding-type systems further include a switch configured to selectively disconnect at least one of the plurality of transformers from the pulse generator. Some examples further include a control circuit configured to selectively close or open the switch to control the second voltage from the plurality of transformers.

Disclosed example arc starting/stabilizing circuits include a plurality of transformers, in which each of the plurality of transformers has one primary winding turn, one secondary winding turn, and a core configured to magnetically couple the primary winding turn and the secondary winding turn. The primary winding turns of the plurality of transformers are configured to receive a voltage pulse simultaneously. The secondary winding turns of the plurality of transformers are coupled in series, configured to conduct welding-type current, and configured to step up the voltage pulse.

In some example arc starting/stabilizing circuits, the primary winding turns of at least two of the plurality of transformers are coupled in parallel and are configured to receive a same voltage pulse from a same pulse generator. In some examples, the primary winding turns of at least two of the plurality of transformers are coupled to different respective pulse generators, the pulse generators configured to simultaneously output respective voltage pulses to the corresponding transformers.

Turning now to the drawings, FIG. 1A is a block diagram of an example welding system 100 including a welding-type power supply 102 configured to output welding-type power and including arc starting/stabilizing circuitry 104 coupled to the output of the welding-type power supply 102. The arc starting/stabilizing circuitry 104, which is described in more detail below, may be affixed or detachable from the welding-type circuit and the power conversion circuitry 110. The welding system 100 powers, controls, and/or supplies consumables to a welding application. In the example of FIG. 1A, the power supply 102 directly supplies welding-type output power to a welding torch 106. The welding torch 106 is configured for SMAW, GTAW, GMAW, or FCAW processes, which may be used to perform welding processes involving AC and/or DC welding-type current.

The power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The power supply 102 includes power conversion circuitry 110, which may include transformers, rectifiers, switches, and so forth, capable of converting the AC input power to DC output power as dictated by the demands of the system 100 (e.g., particular welding processes and regimes). The power conversion circuitry 110 converts input power (e.g., the primary power 108) to welding-type power based on a target amperage (e.g., a weld current setpoint) and outputs the welding-type power via a weld circuit including a weld cable 126. The weld cable 126 couples the power conversion circuitry 110 to the torch 106.

The power supply 102 includes control circuitry 112 to control the operation of the power supply 102. The power supply 102 also includes a user interface 114. The control circuitry 112 receives input from the user interface 114, through which a user may choose a process and/or input desired parameters (e.g., a voltage, a current, a frequency, pulse peak current time, a pulse peak current percentage, a pulse background current time, a pulse background current percentage, an AC waveform type, an AC balance, a weld circuit inductance, etc.). The user interface 114 may receive inputs using one or more input devices 115, such as via a keypad, keyboard, physical buttons, switches, knobs, a mouse, a keyboard, a keypad, a touch screen (e.g., software buttons), a voice activation system, a wireless device, etc. Furthermore, the control circuitry 112 controls operating parameters based on input by the user as well as based on other current operating parameters. Specifically, the user interface 114 may include a display 116 for presenting, showing, or indicating, information to an operator.

The control circuitry 112 may also include interface circuitry for communicating data to other devices in the system 100. For example, in some situations, the power supply 102 communicates with a remote interface via a wireless or wired connection, such as by using a network interface controller (NIC) to communicate data via a network (e.g., ETHERNET, 10baseT, 10base100, etc.), and/or. In some examples, the control circuitry 112 communicates with remote interface via the weld circuit.

The control circuitry 112 includes at least one controller or processor 120 that controls the operations of the power supply 102. The control circuitry 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

The example control circuitry 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device

123 stores data (e.g., data corresponding to a welding application), instructions (e.g., software or firmware to perform welding processes), and/or any other appropriate data. Examples of stored data for a welding application include predetermined relationships between frequency and amperage, such as one or more look up tables, as described in more detail below.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 112 to enable, inhibit, or control gas flow (e.g., shielding gas) through the valve 130. Shielding gas exits the valve 130 and flows through a cable 138 (which in some implementations may be packaged with the welding power output) to the welding torch 106, which provides the shielding gas to the welding application. In some examples, the welding system 100 does not include the gas supply 128, the valve 130, and/or the cable 138.

The welding torch 106 delivers the welding power and/or shielding gas for a welding application. The welding torch 106 is used to establish a welding arc between the welding torch 106 and a workpiece 146. A work cable 148 couples the workpiece 146 to the power supply 102 (e.g., to the power conversion circuitry 110) to provide a return path for the weld current (e.g., as part of the weld circuit). The example work cable 148 is attachable and/or detachable from the power supply 102 for ease of replacement of the work cable 148. The work cable 148 may be terminated with a clamp 150 (or another power connecting device), which couples the power supply 102 to the workpiece 146.

In some examples, one or more sensors 147 are included with or connected to the welding torch 106 to monitor one or more welding parameters (e.g., power, voltage, current, inductance, impedance, etc.) to inform the control circuitry 112 during the welding process.

In some examples, the voltage pulse is repeated at intervals or at a repetition rate until an arc is initiated or the power supply is shut down. When the arc is initiated, the control circuitry 112 ceases the voltage pulses and controls the output of the power conversion circuitry 110 to provide the desired or commanded welding current and/or voltage.

Figure 1B:
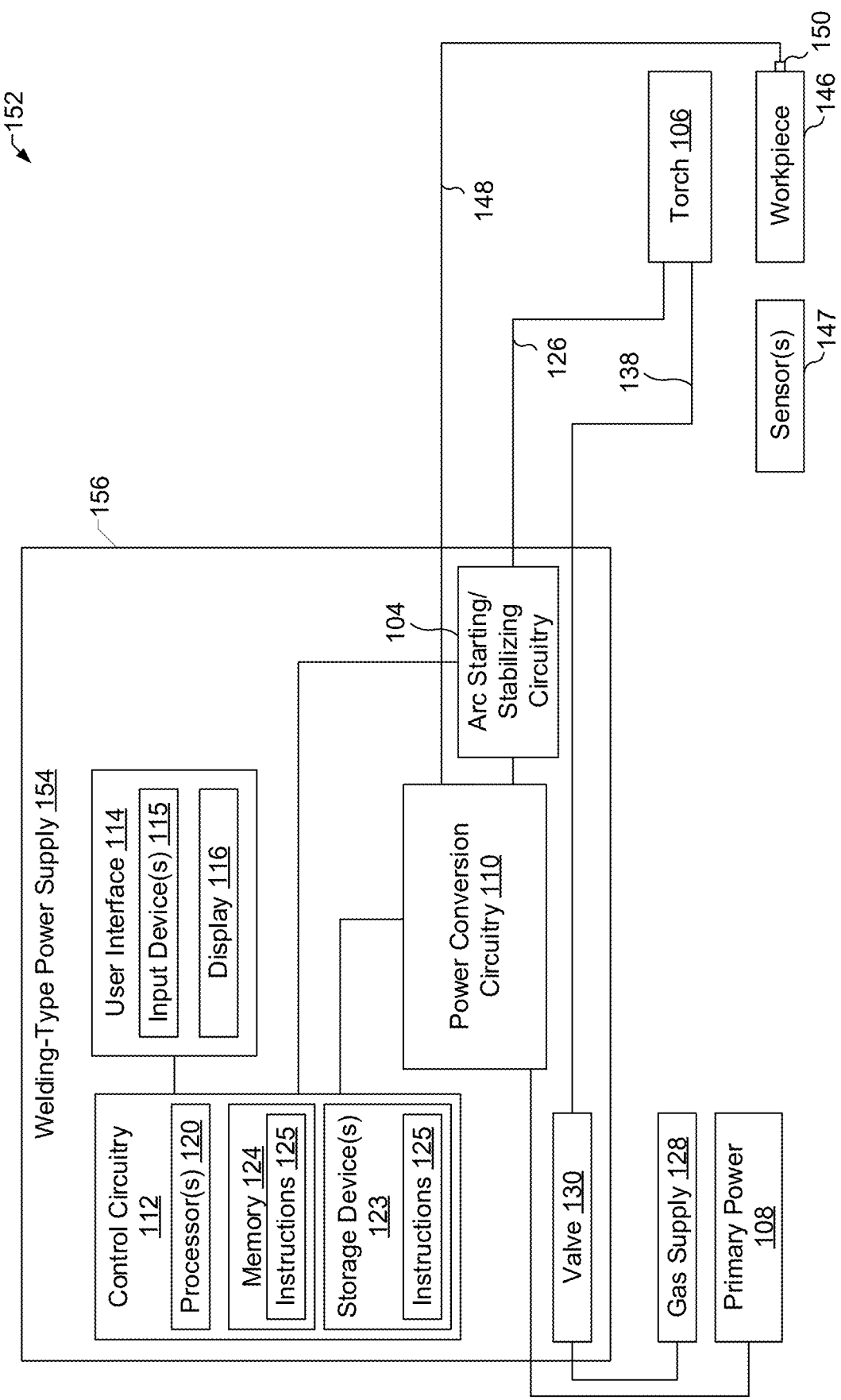
FIG. 1B is a block diagram of another example welding-type system including a welding-type power supply configured to output welding-type power, in which the welding-type power supply includes arc starting/stabilizing circuitry, in accordance with aspects of this disclosure.

FIG. 1B is a block diagram of another example welding-type system 152 including a welding-type power supply 154 configured to output welding-type power. The example welding-type power supply 154 includes the power conversion circuitry 110, the control circuitry 112, the user interface 114, and the valve 130 of the power supply 102 of FIG. 1A. Additionally, the example welding-type power supply 154 includes the arc starting/stabilizing circuitry 104 as an integral component (e.g., within a housing 156 of the welding-type power supply 154), which may be controlled by the control circuitry 112.

The example arc starting/stabilizing circuitry 104 of FIGS. 1A and 1B may be controlled to output high voltage, high frequency signals (e.g., pulses) via the weld circuit. The voltage of the pulses may be selected or controlled, based on the particular welding operation, to break down the air gap between the welding torch 106 (e.g., the welding electrode) and the workpiece 146, which can result in striking the arc without contact between the welding torch 106 and the workpiece 146 and/or in stabilizing (e.g., restriking, preventing extinguishing) an ongoing welding arc.

Figure 2A:
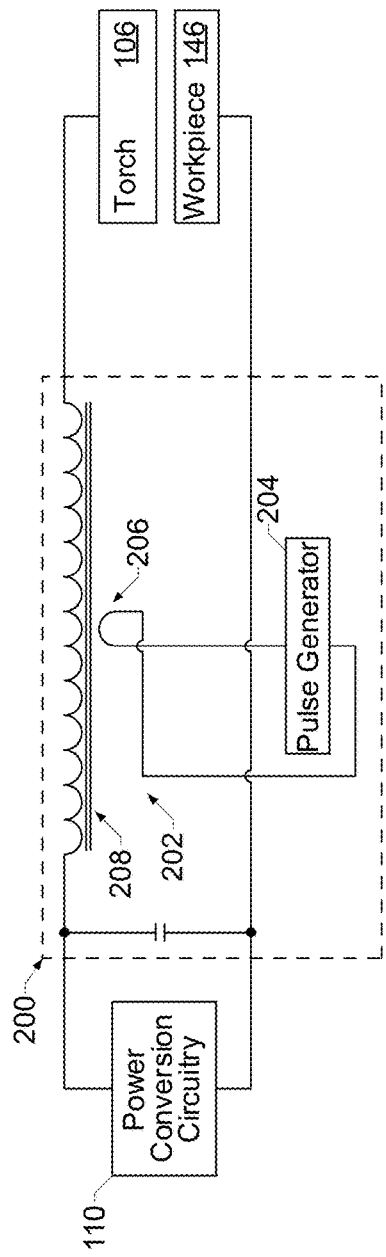
FIG. 2A is a circuit diagram of a conventional arc starting/stabilizing circuitry.

FIG. 2A is a circuit diagram of a conventional arc starting/stabilizing circuitry 200. The conventional arc starting/stabilizing circuitry 200 is in series with the output of the power conversion circuitry 110 of the power supply 102 of FIG. 1A, and includes a step-up transformer 202 placed in series with the electrode (e.g., the torch 106) in the weld circuit. The conventional arc starting/stabilizing circuitry 200 may be used to provide high voltage output pulses at the welding output to assist with arc starting and/or improve arc stability.

A typical conventional application uses a 1:N turns ratio (e.g., 1:13) for the step-up transformer 202. A pulse generator 204 provides a voltage pulse to a primary winding 206 of the transformer 202, which results in a pulse on the welding electrode at the torch 106 via a secondary winding 208 of the transformer 202. For instance, a 1 kV pulse output by the pulse generator 204 results in a 13 kV output pulse using a 1:13 turn transformer.

Figure 2B:
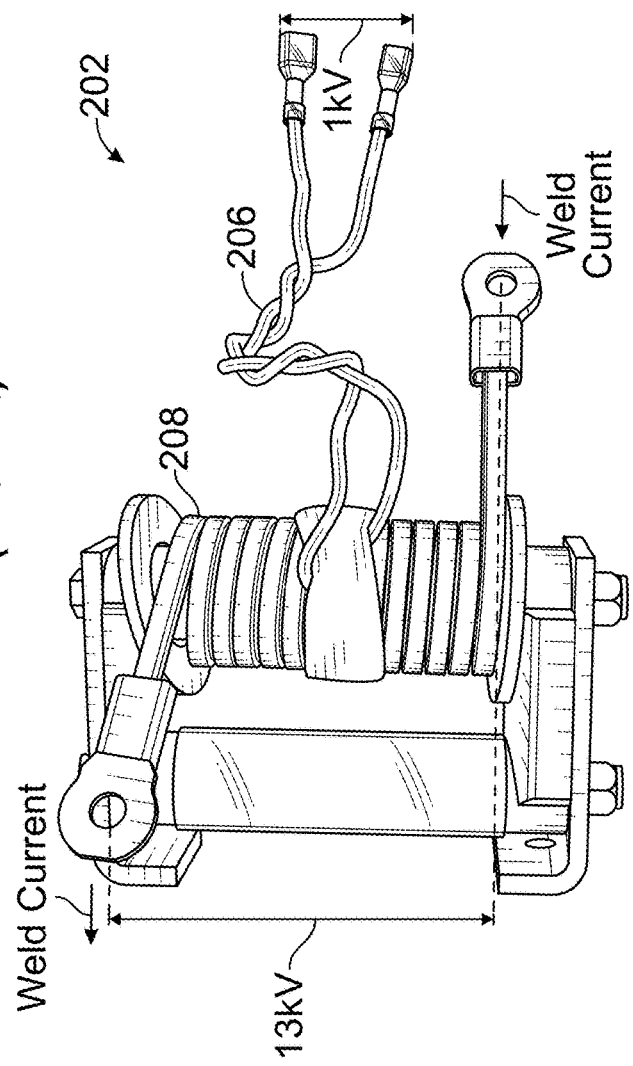
FIG. 2B illustrates a physical implementation of a conventional transformer used in the conventional arc starting/stabilizing circuitry of FIG. 2A.

From a manufacturing standpoint, the step-up transformer is not a trivial device to physically construct. FIG. 2B illustrates a physical implementation of the conventional transformer 202 used in the conventional arc starting/stabilizing circuitry 200 of FIG. 2A. Each of the multiple turns of the secondary winding 208 must be sized to handle the full weld current, which can be in the hundreds of amps. Typically, the secondary winding 208 is constructed using heavy gauge copper. Additionally, the voltage developed across the secondary winding 208 (e.g., ~13 kV) requires insulation of the conductor to avoid arcing from the winding to other elements (e.g., the transformer core, a chassis, other parts of the weld circuit, etc.), and requires winding-to-winding insulation, while still being capable of being reliably wound around a core. Typical applications involve using special insulators and wire (e.g., Kapton™). Given the compromises made in the conductor selection, conventional transformers for conventional arc starting/stabilizing circuitry 200 usually generates significant power losses and require active cooling by forced air.

Figure 3:
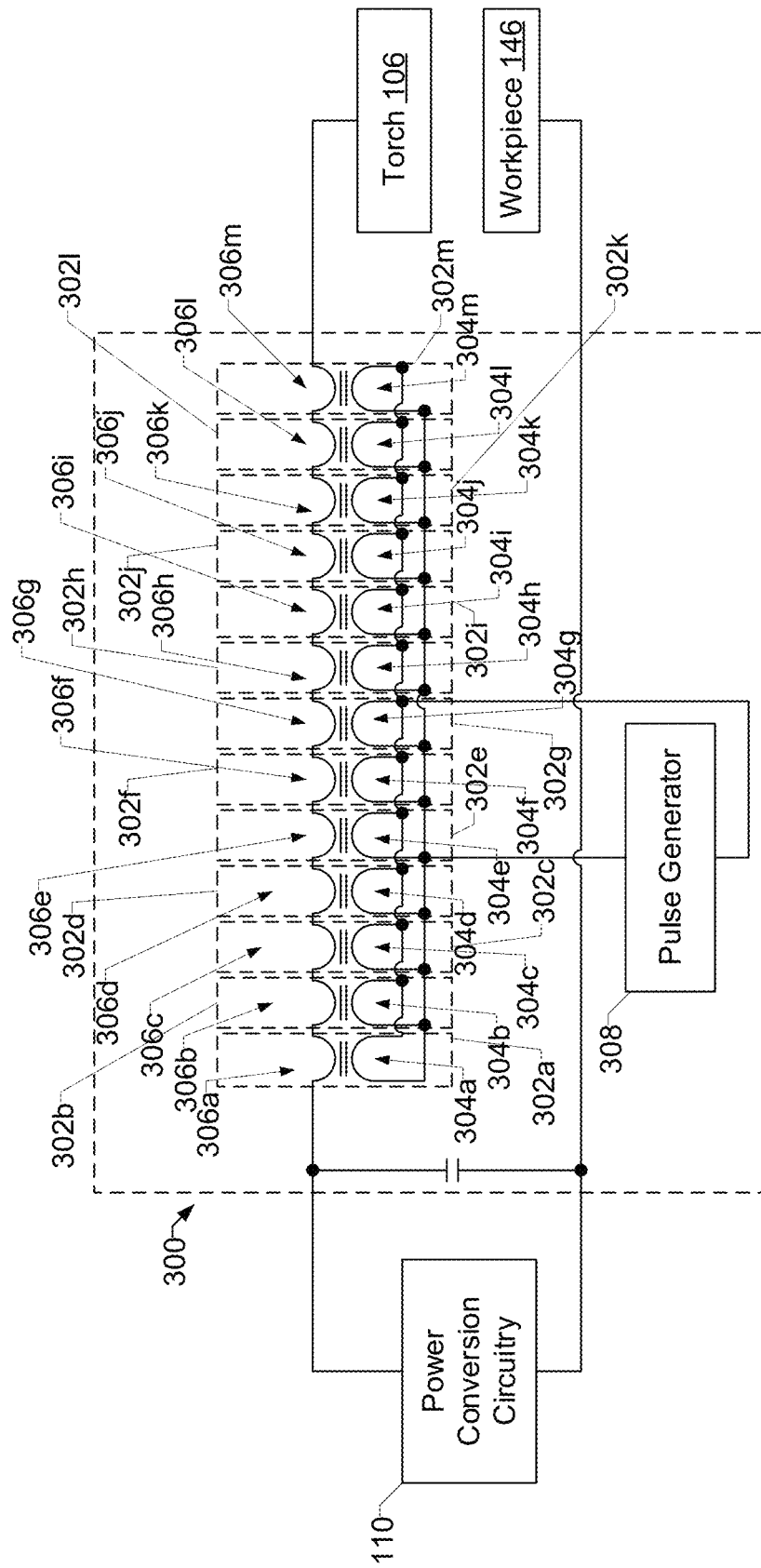
FIG. 3 is a circuit diagram of an example arc starting/stabilizing circuitry that may be used to implement the arc starting/stabilizing circuitry of FIGS. 1A and/or 1B.

FIG. 3 is a circuit diagram of an example arc starting/stabilizing circuitry 300 that may be used to implement the arc starting/stabilizing circuitry 104 of FIGS. 1A and/or 1B. The example arc starting/stabilizing circuitry 300 is coupled in series with an output of the power conversion circuitry 110, and may be implemented separate from the power supply (e.g., the power supply 102 of FIG. 1A) or as a component of the power supply (e.g., the power supply 154 of FIG. 1B). For example, the arc starting/stabilizing circuitry 300 may be coupled to terminals to which the power supply 102 and/or the welding-torch 106 can be attached to retrofit the arc starting/stabilizing circuitry 300 to the weld circuit.

The example arc starting/stabilizing circuitry 300 of FIG. 3 includes multiple 1:1 transformers 302a-302m, in which each of the transformers 302a-302m includes a primary winding 304a-304m and a secondary winding 306a-306m. To provide a similar step-up in voltage as the conventional arc starting/stabilizing circuitry of FIG. 2A from a similar voltage pulse (e.g., 13:1 step-up), the example arc starting/stabilizing circuitry 300 includes a same number of the 1:1 transformers 302a-302m (e.g., 13 transformers) as the desired step-up ratio (e.g., 13:1), and the secondary windings 306a-306m are connected in series.

The example 1:1 transformers 302a-302m are configured such that the primary windings 304a-304m are coupled in parallel to a pulse generator 308. In contrast to the conventional transformers, the secondary windings 306a-306m of each of the example transformers 302a-302m includes only 1 turn. Because the secondary windings 306a-306m handle the full welding-type output current from the power conversion circuitry 110, the secondary windings 306a-306m may be significantly simplified, which reduces the complexity and cost involved in manufacturing the arc starting/stabilizing circuitry 300.

While the example primary windings 304a-304m are coupled in parallel to a common pulse generator 308 in the example of FIG. 3, in other examples some or all of the primary windings 304a-304m are coupled to separate pulse generator(s). For example, each of the primary windings 304a-304m may be coupled to a different pulse generator. Additionally or alternatively, subsets of the primary windings 304a-304m may be coupled in parallel to shared pulse generators (e.g., 2, 3, 4, 5, 6, 7, or more pulse generators for 13 transformers 302a-302m). In still other examples, the primary windings 304a-304m may be coupled in parallel to multiple pulse generators. By increasing a number of pulse generators, the resulting output voltage of the arc starting/stabilizing circuitry 300 can be adjusted by changing the utilization of the pulse generators (e.g., reducing or increasing the number of pulse generators outputting a pulse).

Figure 4A:
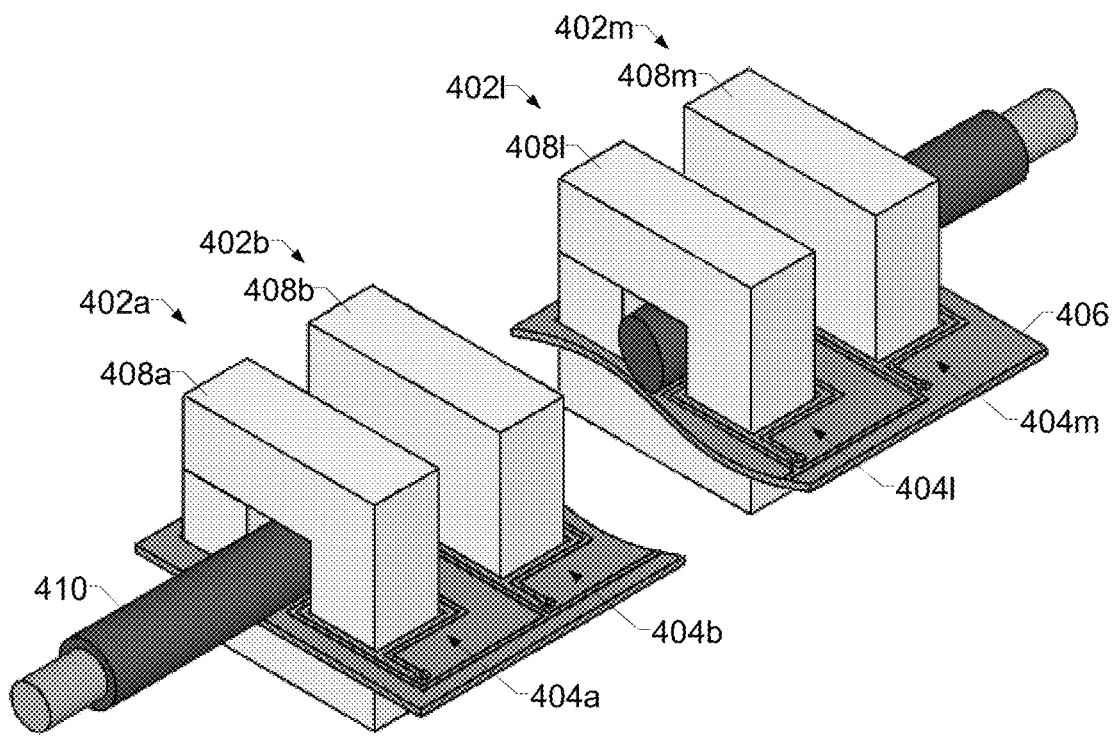
FIG. 4A illustrates an example implementation of the 1:1 transformers of the arc starting/stabilizing circuitry of FIG. 3.
Figure 4B:
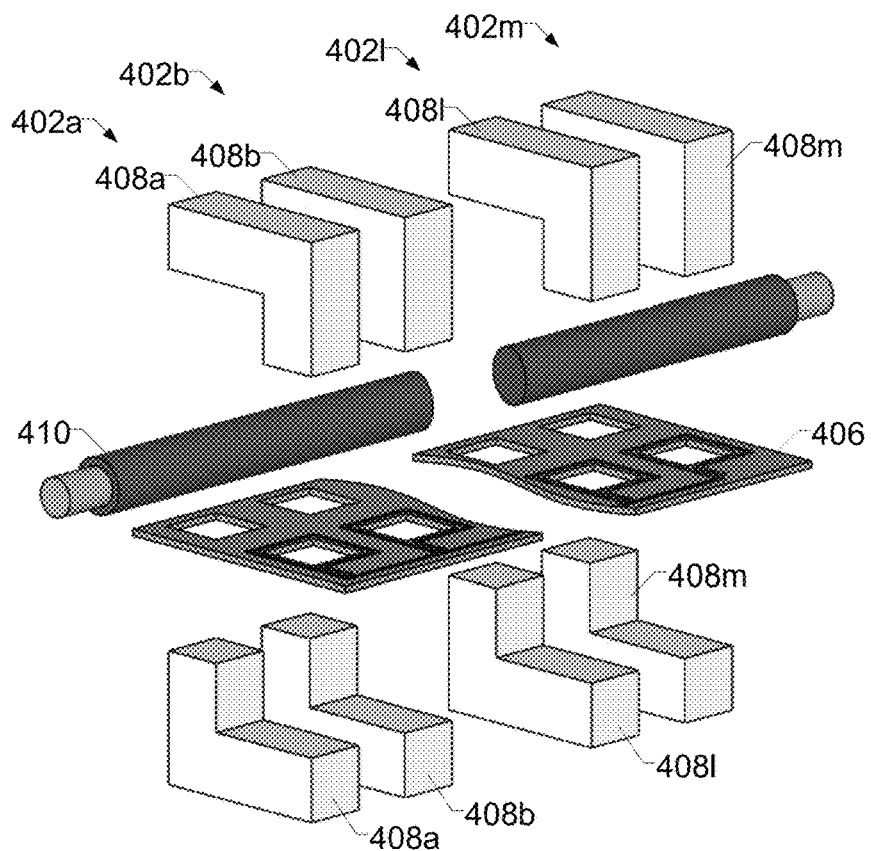
FIG. 4B is an exploded view of the example transformers of FIG. 4A.

FIG. 4A illustrates an example set of 1:1 transformers 402a, 402b, . . . 402l, 402m that may be used to implement ones of the 1:1 transformers 302a-302m of the arc starting/stabilizing circuitry 300 of FIG. 3. FIG. 4B is an exploded view of the example transformers of FIG. 4A. While four of the example transformers 402a, 402b . . . 402l, 402m are shown in FIGS. 4A and 4B, the number of transformers can be scaled to any number for a given step-up ratio.

FIGS. 4A and 4B illustrate how a substantially simpler manufacture of an arc starting/stabilizing circuitry can be accomplished using the example arc starting/stabilizing circuitry 300 of FIG. 3. In the example of FIGS. 4A and 4B, the transformers 402a, 402b, . . . 402l, 402m each include respective primary windings 404a, 404b, . . . 402l, 402m implemented as traces on a printed circuit board 406 (or multiple printed circuit boards).

Each of the example primary windings 404a, 404b, . . . 404l, 404m makes one loop around a respective magnetic core 408a, 408b, . . . 408l, 408m of the transformer 402a, 402b, . . . 402l, 402m. The cores 408a, 408b, . . . 408l, 408m magnetically couple the respective primary winding turn 404a, 404b, . . . 404l, 404m and the secondary winding turn (e.g., a section of the weld conductor 410). The example cores 408a, 408b, . . . 408l, 408m are implemented using multiple ferrite segments, such as U cores, I cores, or L cores, that are fit to the circuit board 406 such that the primary windings 404a, 404b, . . . 402l, 402m make one loop around one leg of the core 408a, 408b, . . . 408l, 408m. As illustrated in FIG. 4B, the circuit board 406 may include orifices through which the ferrite components making up the cores 408a, 408b, . . . 408l, 408m can be passed to secure the cores 408a, 408b, . . . 408l, 408m to the circuit board 406.

The secondary winding turns collectively comprise a straight conductor, such as a weld conductor 410, extending through the cores 408a, 408b, . . . 408l, 408m of the transformers 402a, 402b, . . . 402l, 402m. The secondary windings of the transformers 402a, 402b, . . . 402l, 402m are constructed by feeding the weld conductor 410 through the centers of the cores 408a, 408b, . . . 408l, 408m, or constructing the cores 408a, 408b, . . . 408l, 408m around the weld conductor 410. In the example of FIGS. 4A and 4B, the weld conductor 410 may be passed straight through the set of cores 408a, 408b, . . . 408l, 408m, resulting in a series connection of the secondary windings of the transformers 402a, 402b, . . . 402l, 402m. Thus, the secondary windings turns of the transformers 402a, 402b, . . . 402l, 402m are not physically wound around the cores 408a, 408b, . . . 408l, 408m. Instead, the cores 408a, 408b, . . . 408l, 408m of the transformers 402a, 402b, . . . 402l, 402m are each positioned to encircle the secondary winding turns (e.g., sections of the weld conductor 410), and the one primary winding turn 404a, 404b, . . . 404l, 404m of each of the transformers 402a, 402b, . . . 402l, 402m is wound around one leg of the corresponding core 408a, 408b, . . . 408l, 408m. As used herein, the term "leg" of a transformer refers to a portion of the magnetic circuit of the transformer. For example, the primary winding turn 404a, 404b, . . . 404l, 404m may be wound around one cross-section of the core 408a, 408b, . . . 408l, 408m.

An advantage of the example configuration of FIGS. 4A and 4B over the conventional construction of FIG. 2B is the simplicity of the secondary windings of the transformer arrangement. For example, instead of a complex and delicate winding process involving turn-to-turn insulation as in the conventional construction, the example construction of FIGS. 4A and 4B involves feeding the weld conductor through the core apertures. Such a construction can be accomplished with off-the-shelf welding conductors, and/or enables the transformers 402a, 402b, . . . 402l, 402m to be coupled to a weld circuit at the output of a power supply.

Additionally, since the construction of FIGS. 4A and 4B does not involve winding the weld conductor, a larger conductor can be used for the weld conductor 410 than in the conventional construction, which reduces power losses in the system and/or may reduce or avoid the need for active cooling of the power supply and/or the arc starting/stabilizing circuitry 300. The example construction of FIGS. 4A and 4B may also reduce the complexity and/or cost of isolating other circuits from the high voltage output of the arc starting/stabilizing circuitry 300.

By connecting multiple primary windings in parallel, the example arc starting/stabilizing circuitry 300 of FIG. 3 reduces the high frequency AC resistance of the primary windings. For example, because the pulses output by the pulse generator 308 may be of elevated frequency (e.g., 500 kHz-2 MHz), the skin effect reduces the effective conductor cross section. By connecting multiple smaller conductors of the primary windings 304a-304m in parallel, instead of having a single primary winding as in the conventional construction, the primary windings 304a-304m collectively have a lower resistance than the primary winding 206 of the conventional transformer 202. When a breakover occurs and pulse current flows in the secondary windings, the reflected primary current can be greater than 200 A. Reducing the resistance in the primary windings 304a-304m advantageously allows higher current flow and improves the ring duration of the circuit.

As an alternative to the example construction of FIGS. 4A and 4B, the transformers 302a-302m of the arc starting/ stabilizing circuitry 300 may be implemented using other core and/or winding constructions. For example, closed ferrite cores (e.g., cylindrical cores, or other cross-sections, that have a bore or other aperture) may have the weld conductor 410 passed through the ferrite cores. Ferrite cores having a clamshell-type housing may be installed onto the weld conductor 410 by fastening the ferrite cores around the weld conductor 410. Furthermore, instead of implementing the primary windings 304a-304m using printed circuit board traces, the primary windings may be constructed using physical wires.

While the example of FIGS. 4A and 4B are shown using a straight conductor passing through the cores to make a single turn each, other constructions may involve two or more turns of the weld conductor 410 through a single core. For example, one or more of the cores 408a-408m may be sized to fit two or more turns of the weld conductor through the aperture of the core 408a-408m. The arc starting/stabilizing circuitry 300 may be modified to account for a turn ratio involving a higher number of secondary winding turns, relative to the 1:1 turn ratio of the example construction of FIGS. 4A and 4B. While such constructions involve fewer of the advantages of the example construction of FIGS. 4A and 4B, some of the benefits are still obtained relative to the conventional construction described above with reference to FIG. 2B.

Figure 5A:
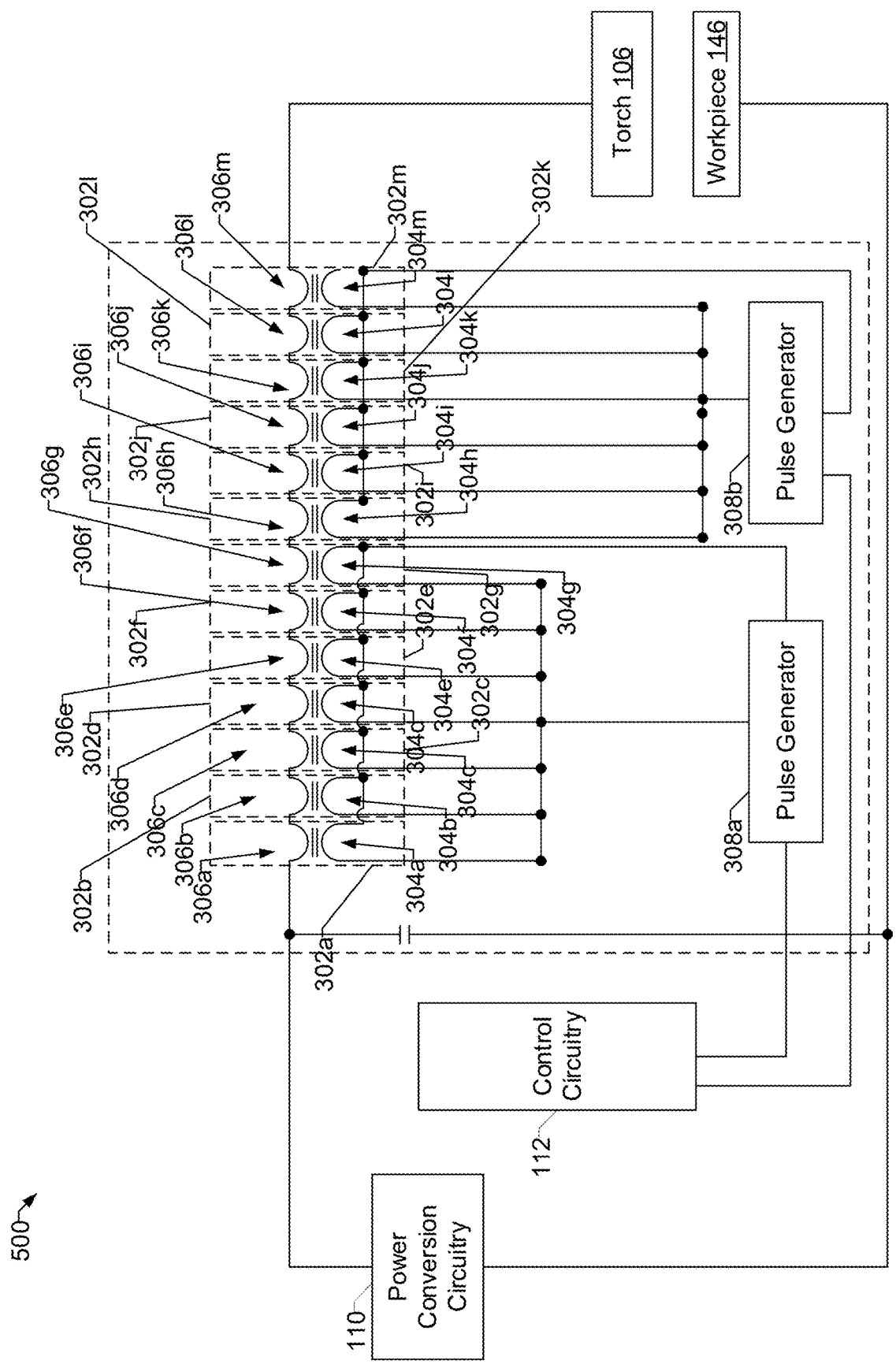
FIG. 5A is a circuit diagram of another example arc starting/stabilizing circuitry that may be used to implement the arc starting/stabilizing circuitry of FIGS. 1A and/or 1B, including multiple pulse generators coupled to different subsets of the transformers.

FIG. 5A is a circuit diagram of another example arc starting/stabilizing circuitry 500 that may be used to implement the arc starting/stabilizing circuitry 104 of FIGS. 1A and/or 1B. The example arc starting/stabilizing circuitry 500 includes the example transformers 302a-302m of FIG. 3. The arc starting/stabilizing circuitry 500 and is connected to an output of the power conversion circuitry 110 and to the torch 106 to output high voltage pulses for arc starting and/or arc stabilization.

The arc starting/stabilizing circuitry 500 of FIG. 5A further includes pulse generators 308a, 308b, which may be similar or identical to the pulse generator 308 of FIG. 3. A first one of the pulse generators 308a is coupled to a first subset of the transformers 302a-302g, and a second one of the pulse generators 308b is coupled to a second subset of the transformers 302h-302m. In other examples, the arc starting/stabilizing circuitry 500 may include more pulse generators 308a, 308b coupled to different subsets of the transformers 302a-302m, and/or the two pulse generators 308a, 308b may be coupled to overlapping subsets of the transformers 302a-302m, and/or the two pulse generators 308a, 308b may be coupled to different subsets of the transformers 302a-302m than in the illustrated example.

The pulse generators 308a, 308b may be controlled (e.g., by the control circuitry 112 and/or by other control circuitry) to selectively output pulses to the subsets of the transformers 302a-302m to simultaneously deliver pulses to multiple subsets and/or to output pulses to one of the subsets to output a desired pulse voltage to the weld circuit.

Figure 5B:
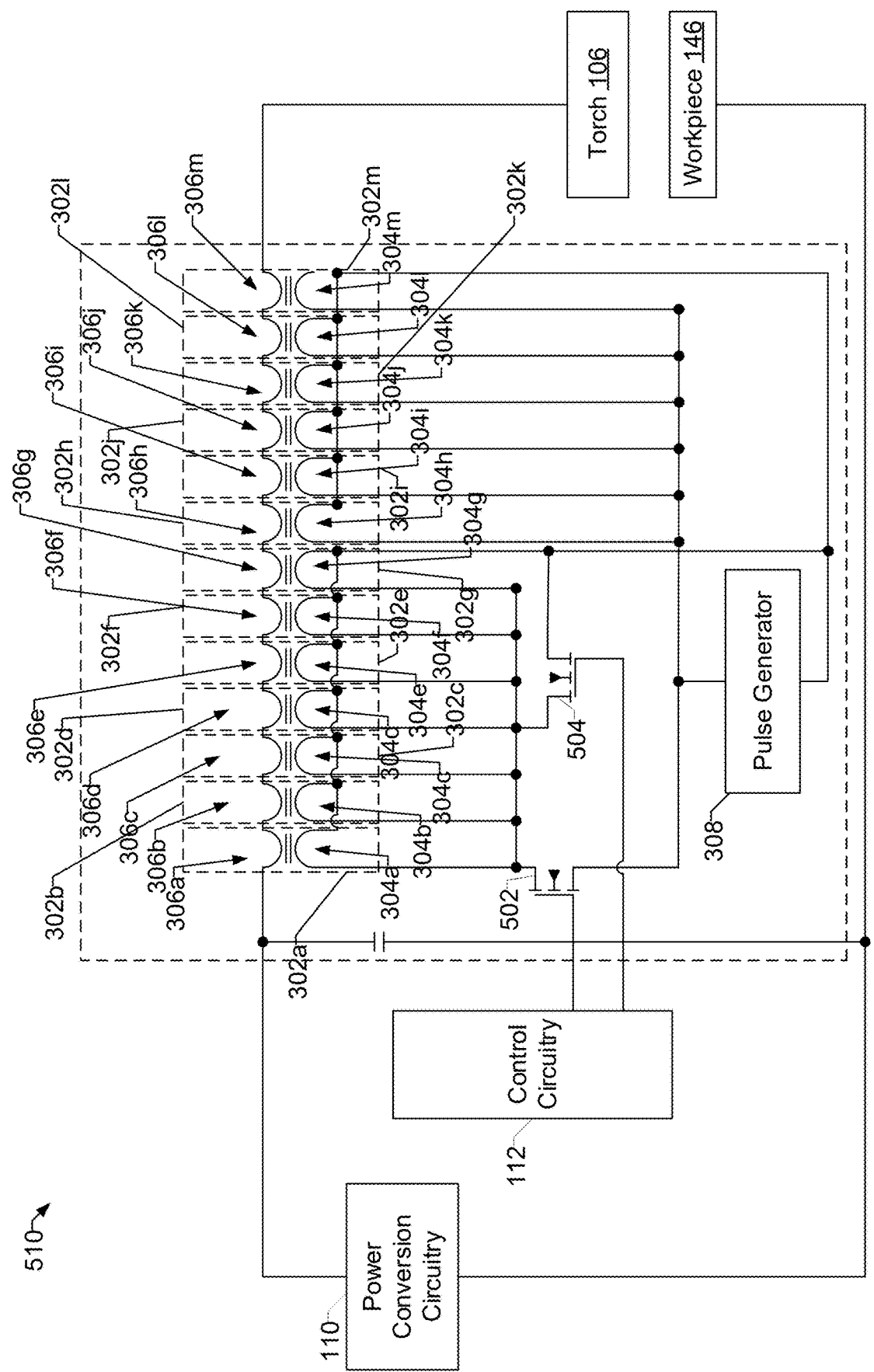
FIG. 5B is a circuit diagram of another example arc starting/stabilizing circuitry that may be used to implement the arc starting/stabilizing circuitry of FIGS. 1A and/or 1B, including switches to disconnect individual ones of the transformers.

FIG. 5B is a circuit diagram of another example arc starting/stabilizing circuitry 510 that may be used to implement the arc starting/stabilizing circuitry 104 of FIGS. 1A and/or 1B. The example arc starting/stabilizing circuitry 500 includes the example transformers 302a-302m and the pulse generator 308 of FIG. 3, and is connected to an output of the power conversion circuitry 110 and to the torch 106 to output high voltage pulses for arc starting and/or arc stabilization.

The example arc starting/stabilizing circuitry 500 includes switches 502, 504, 506 to control utilization of subsets of the transformers 302a-302m. In the example of FIG. 5B, one subset of the transformers 302a-302g is controlled using the switch 502. However, in other examples, different subsets of the transformers 302a-302m may be selectively utilized using the switches 502-506, and/or all of the transformers 302a-302m may be controlled using respective switches. For example, each of the transformers 302a-302m may be controlled using a different set of switches.

The example switches 502, 504, are controlled via the control circuitry 112 of the power supply 154 (e.g., the control circuitry 112 that also controls the power conversion circuitry 112). In other examples, the switches 502, 504 may be configured by the operator using hardware switches, and/or may include separate control circuitry. The switch 502 selectively couple the primary windings 304a-304g of the example subset of transformers 302a-302g to the pulse generator 308. When the switch 502 is controlled to decouple the primary windings 304a-304g from the pulse generator 308, the switch 504 couples the terminals of the primary windings 304a-304g to reduce the load on the pulse generator 308. By selectively connecting or disconnecting subsets of the transformers 302a-302m from the pulse generator 308, the number of transformers 302a-302m that are coupled to the pulse generator 308, and therefore output a pulse, can be controlled to thereby control the voltage of the resulting output pulse output by the secondary windings 306a-306m.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An arc starting/stabilizing circuit, comprising:
   a pulse generator configured to generate a first voltage pulse having a first voltage; and
   a plurality of transformers configured to receive the first voltage pulse and output a second voltage pulse to a welding-type output circuit at a second voltage higher than the first voltage, the second voltage being based on the first voltage and a number of the plurality of transformers, wherein:
   each of the plurality of transformers has one primary winding turn, one secondary winding turn, and a core configured to magnetically couple the primary winding turn and the secondary winding turn;
   the primary winding turn of each of the plurality of transformers is coupled to the pulse generator to receive the first voltage pulse, wherein the primary winding turn of each of the plurality of transformers comprises a respective trace on one or more printed circuit assemblies, and the plurality of transformers extend through the one or more printed circuit assemblies; and
   the secondary winding turns of the plurality of transformers are coupled in series and are configured to conduct welding-type current in the welding-type output circuit, wherein the secondary winding turns collectively comprise a same conductor extending through the cores of the plurality of transformers.

2. The arc starting/stabilizing circuit as defined in claim 1, wherein the cores of the plurality of transformers are each positioned to encircle the secondary winding turns of the plurality of transformers, and the one primary winding turn of each of the plurality of transformers turns around one leg of the corresponding core.

3. The arc starting/stabilizing circuit as defined in claim 1, wherein for each of the plurality of transformers, the secondary winding turn is not physically wound around the core.

4. The arc starting/stabilizing circuit as defined in claim 1, further comprising a switch configured to selectively disconnect at least one of the plurality of transformers from the pulse generator.

5. The arc starting/stabilizing circuit as defined in claim 4, further comprising a control circuit configured to selectively close or open the switch to control the second voltage from the plurality of transformers.

6. The arc starting/stabilizing circuit as defined in claim 1, wherein core of each of the plurality of transformers comprises a ferrite core having a clamshell-type housing and configured to be installed onto a weld conductor.

7. The arc starting/stabilizing circuit as defined in claim 1, wherein the plurality of transformers are configured to be coupled to the welding-type output circuit at an output of a welding-type power supply.

8. An arc starting/stabilizing circuit, comprising:
a plurality of transformers, each of the plurality of transformers having one primary winding turn, one secondary winding turn, and a core configured to magnetically couple the primary winding turn and the secondary winding turn,
wherein the respective primary winding turns of the plurality of transformers are configured to receive a first voltage pulse simultaneously, the voltage pulse having a first voltage,
wherein the primary winding turn of each of the plurality of transformers comprises a respective trace on one or more printed circuit assemblies, and the plurality of transformers extend through the one or more printed circuit assemblies,
wherein the secondary winding turns of the plurality of transformers are coupled in series, are configured to conduct welding-type current, and are configured to step up the voltage pulse to output a second voltage pulse having a second voltage based on the first voltage and a number of the plurality of transformers.

9. The arc starting/stabilizing circuit as defined in claim 8, wherein the primary winding turns of at least two of the plurality of transformers are coupled in parallel and are configured to receive a same voltage pulse from a same pulse generator.

10. The arc starting/stabilizing circuit as defined in claim 8, wherein the primary winding turns of at least two of the plurality of transformers are coupled to different respective pulse generators, the pulse generators configured to simultaneously output respective voltage pulses to the corresponding transformers.

11. The arc starting/stabilizing circuit as defined in claim 8, wherein the secondary winding turns collectively comprise a same conductor extending through the cores of the plurality of transformers.

* * * * *